(12) United States Patent
Kimura et al.

(10) Patent No.: US 8,337,021 B2
(45) Date of Patent: Dec. 25, 2012

(54) OPTICAL PROJECTION TYPE IMAGE DISPLAY DEVICE

(75) Inventors: Nobuyuki Kimura, Yokohama (JP); Koji Hirata, Yokohama (JP); Masahiko Yatsu, Fujisawa (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 294 days.

(21) Appl. No.: 12/776,081

(22) Filed: May 7, 2010

(65) Prior Publication Data
US 2011/0075100 A1    Mar. 31, 2011

(30) Foreign Application Priority Data

Sep. 29, 2009    (JP) ................................ 2009-224917

(51) Int. Cl.
- *G03B 21/14* (2006.01)
- *G03B 21/28* (2006.01)
- *F21V 9/00* (2006.01)
- *G02B 5/30* (2006.01)
- *G02B 27/28* (2006.01)

(52) U.S. Cl. ................ 353/20; 353/33; 353/84; 353/98; 362/293; 359/487.04

(58) Field of Classification Search ...................... 353/20, 353/98, 33, 84; 362/293; 359/487.04
See application file for complete search history.

(56) References Cited

U.S. PATENT DOCUMENTS

| | | | |
|---|---|---|---|
| 6,231,192 B1 | 5/2001 | Konno et al. | |
| 2005/0231661 A1* | 10/2005 | Lazarev et al. | 349/106 |
| 2005/0280778 A1* | 12/2005 | Kurioka | 353/20 |
| 2006/0007538 A1 | 1/2006 | Robinson | |
| 2008/0225237 A1 | 9/2008 | Amano et al. | |
| 2009/0086167 A1* | 4/2009 | Yatsu et al. | 353/20 |

FOREIGN PATENT DOCUMENTS

| | | |
|---|---|---|
| CN | 101266339 A | 9/2008 |
| JP | 2003-121811 A | 4/2003 |
| JP | 2004-133112 | 4/2004 |
| JP | 2005-062212 | 3/2005 |
| JP | 2005-321544 | 11/2005 |
| JP | 2006-292901 | 10/2006 |
| JP | 2009-086078 | 4/2009 |
| WO | WO 2009/139798 A1 | 11/2009 |

OTHER PUBLICATIONS

Chinese Office Action, issued in Chinese Patent Application No. 201010193945.1, dated Sep. 22, 2011.
European Search Report issued in European Patent Application No. 10250874.4-2217, dated Dec. 14, 2010.

* cited by examiner

*Primary Examiner* — Georgia Y Epps
*Assistant Examiner* — Magda Cruz
(74) *Attorney, Agent, or Firm* — McDermott Will & Emery LLP

(57) ABSTRACT

A projection type image display device using, in a projection optical system thereof, a flat mirror, which is easy to design and manufacture, as a projection mirror is provided. The projection optical system is a diagonal projection optical system and includes plural lenses. Among the plural lenses, the one disposed closest to the flat mirror has an effective area, along the vertical direction of an image, through which a light beam passes and which is off an optical axis of the other plurality of lenses, shared by the most lenses so as not to allow light reflected from the projection mirror to return to the projector body. A polarization converter using, for example, a quarter wavelength plate is provided at an output surface of a crossed prism to decrease reflectance differences between differently colored light and to thereby prevent the occurrence of color unevenness.

3 Claims, 13 Drawing Sheets

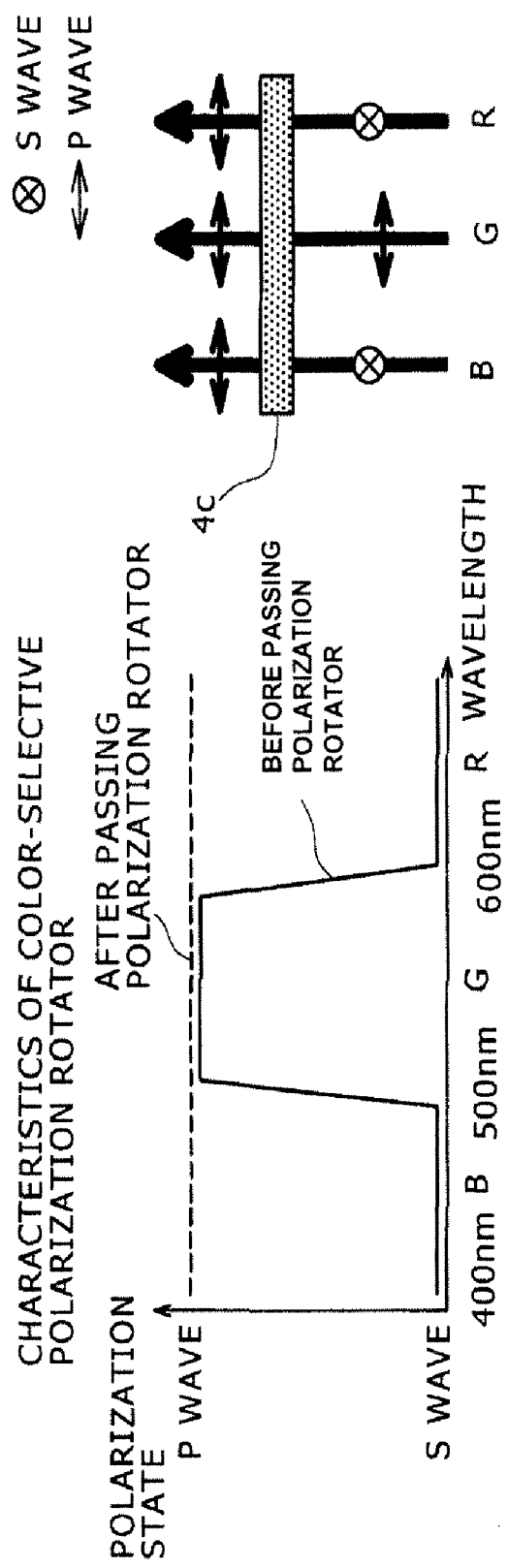

FIG. 11A
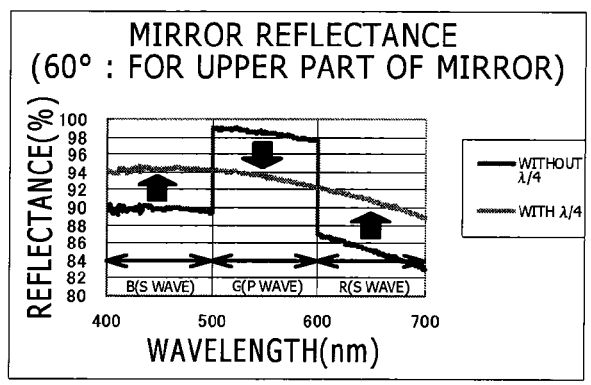 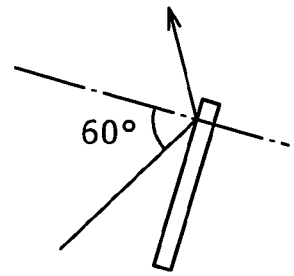
FIG. 11B
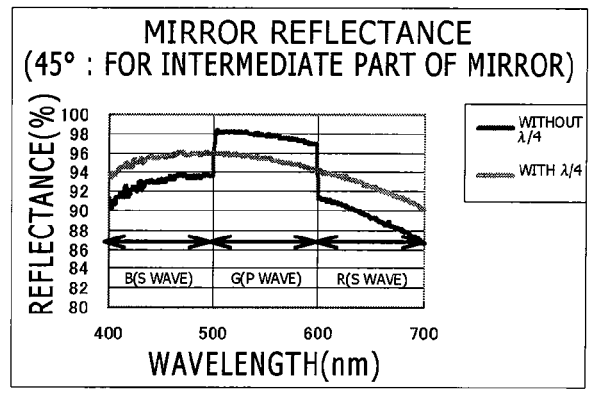 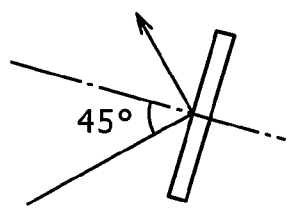
FIG. 11C
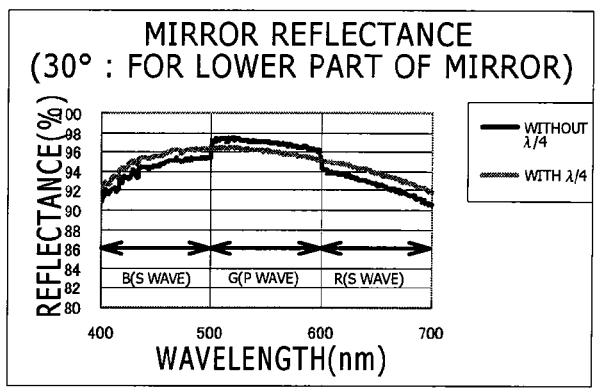 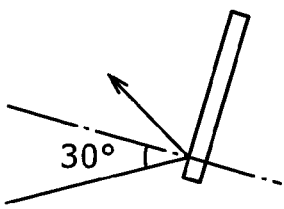

OPTICAL PROJECTION TYPE IMAGE DISPLAY DEVICE

This application relates to and claims priority from Japanese Patent Application No. 2009-224917 filed on Sep. 29, 2009, the entire disclosure of which is incorporated herein by reference.

BACKGROUND OF THE INVENTION (1) Field of the Invention

The present invention relates to a projection type image display device, particularly, a projection type image display device with reduced color unevenness using a flat mirror in its projection system.

(2) Description of the Related Art

In projection type image display devices, for example, liquid crystal projectors, color unevenness can occur in a color synthesis process performed at a crossed prism due to differences in reflectance (transmittance) between P-polarized light and S-polarized light. Measures against the problem are disclosed in Japanese Patent Application Laid-Open Nos. 2005-321544 and 2004-133112. Japanese Patent Application Laid-Open No. 2006-292901 discusses the incident angle to an image projection surface in a projection optical system.

In Japanese Patent Application Laid-Open No. 2005-321544, it is pointed out that color unevenness is caused depending on the combination of polarization properties (Fresnel lenses) inherent to transmissive screens and the state of polarization of incident light, and a method for reducing color unevenness is disclosed in which a pseudo polarization-free state is generated by using a phase plate with a phase difference of 5000 nm.

In Japanese Patent Application Laid-Open No. 2004-133112, it is pointed out that, as a cause of color unevenness, there is a reflectance difference of about 17% (i.e. about 22% for S-polarized light less about 5% for P-polarized light) at a wavelength of 550 nm at a half mirror disposed in a 45-degree position in a prompter (observation unit), and use of a wavelength plate for reducing color unevenness is proposed.

Japanese Patent Application Laid-Open No. 2006-292901 discloses, as a super wide-angle projection optical system with a shortened projection distance, a projection optical system of a diagonal projection type in which an image is projected in a diagonal direction with respect to an image projection surface.

SUMMARY OF THE INVENTION

Conventional projection type image display devices include free-form surface mirrors used as projection mirrors. Compared with flat mirrors, free-form surface mirrors are difficult to design and manufacture, so that they tend to become expensive. There are two main reasons for which free-form surface mirrors having disadvantages as mentioned above are used as projection mirrors. One of the main reasons is that designing a flat mirror optical system in which no part of the light reflected from the flat mirror returns to the projector body is difficult. The other is that the incident angle to a flat projection mirror of projection light becomes large particularly when projecting an image on a large image projection surface (e.g. a screen). When the incident angle to the projection mirror is large, differences in reflectance between P-polarized light and S-polarized light are likely to cause color unevenness to detrimentally affect the quality of image projection.

An object of the present invention is to provide, by addressing the above problem, a projection type image display device using a flat mirror as a projection mirror to reduce color unevenness.

To achieve the object, the present invention provides a projection type image display device which, enlarging an image displayed on an imaging surface, projects the image on an external image projection surface. The projection type image display device includes: an image display element having, for example, liquid crystal and provided for each of the three primary color light; an illumination optical system for illuminating the image display elements for the three primary color light; a color synthesis unit for color-synthesizing light supplied from the image display elements; a polarization converter which subjects light supplied from the color synthesis unit to polarization conversion; a projection optical system which outputs light supplied from the polarization converter in a direction inclined by a predetermined inclination angle; and a flat mirror which reflects light supplied from the projection optical system toward an external image projection surface.

The present invention provides a projection type image display device which, using a flat mirror as a projection mirror, can reduce color unevenness and improve the quality of image projection.

BRIEF DESCRIPTION OF THE DRAWINGS

These and other features, objects and advantages of the present invention will become more apparent from the following description when taken in conjunction with the accompanying drawings wherein:

FIG. 9C illustrates a polarization conversion operation performed using a color-selective polarization rotator;

FIG. 11A is a first diagram showing effects of a quarter wavelength plate on reflectance;

FIG. 11B is a second diagram showing effects of a quarter wavelength plate on reflectance;

FIG. 11C is a third diagram showing effects of a quarter wavelength plate on reflectance.

DETAILED DESCRIPTION OF THE EMBODIMENT

In the following, color synthesis and color unevenness will be discussed, then an embodiment of the present invention will be described with reference to drawings. A color synthesis unit or a crossed prism used as a color synthesis unit of a projection type image display device can perform color synthesis by having transmitted light inputted thereto as P-polarized light and reflected light inputted thereto as S-polarized light. This will be explained with reference to FIGS. 1, 2A, and 2B.

Figure 1:
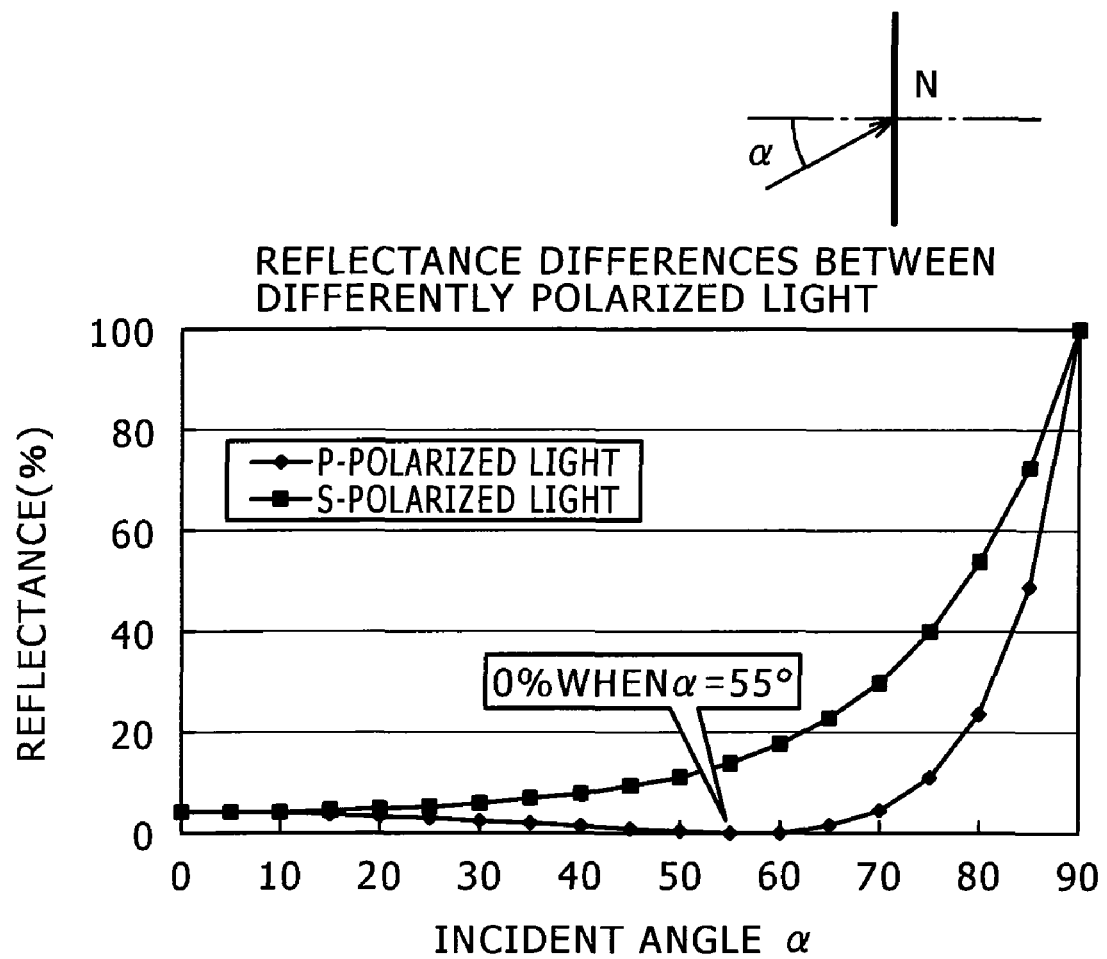
FIG. 1 is a graph showing the relationship between the incident angle and reflectance of each of P-polarized light and S-polarized light.

FIG. 1 is a graph showing the relationship between the incident angle and reflectance of each of P-polarized light and S-polarized light incident, through the air, to a transparent medium at an incident angle. The reflectances $R_p$ and $R_s$, (represented along the vertical axis of the graph) of P-polarized light and S-polarized light, respectively, are determined by the following equations (1), respectively:

$$R_p = \{\tan(\alpha-\beta)/\tan(\alpha+\beta)\}^2$$

$$R_s = \{\sin(\alpha-\beta)/\sin(\alpha+\beta)\}^2 \quad (1)$$

where $\alpha$ represents an incident angle (represented along the horizontal axis of the graph) in the air and $\beta$ represents a refraction angle in a medium (with a refractive index N).

S-polarized light is greater in reflectance than P-polarized light. According to the result, shown in FIG. 1, of calculation made based on the assumption that the refractive index N ($=\sin \alpha/\sin \beta$) of the medium is 1.5 (equivalent to that of glass), the reflectance of P-polarized light with an incident angle of 55 degrees is approximately 0%. The incident angle at which the reflectance of P-polarized light becomes 0% is referred to as Brewster angle. When natural light hits a flat plate placed at the Brewster angle of the plate, only S-polarized light is reflected while P-polarized light is entirely transmitted through the plate. When the incident angle $\alpha$ is 0 degree, the reflectance of P-polarized light as well as S-polarized light is 4% ($=\{(N-1)/(N+1)\}^2$).

Figure 2A:
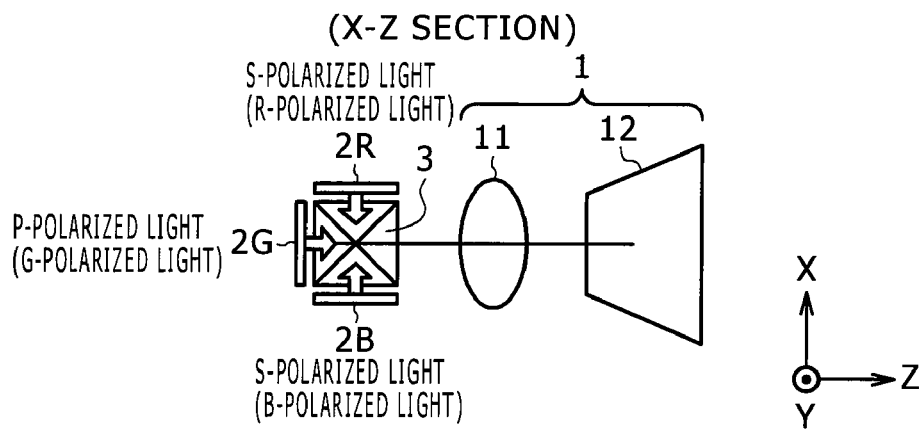
FIG. 2A is a sectional block diagram of a conventional projection optical system.
Figure 2B:
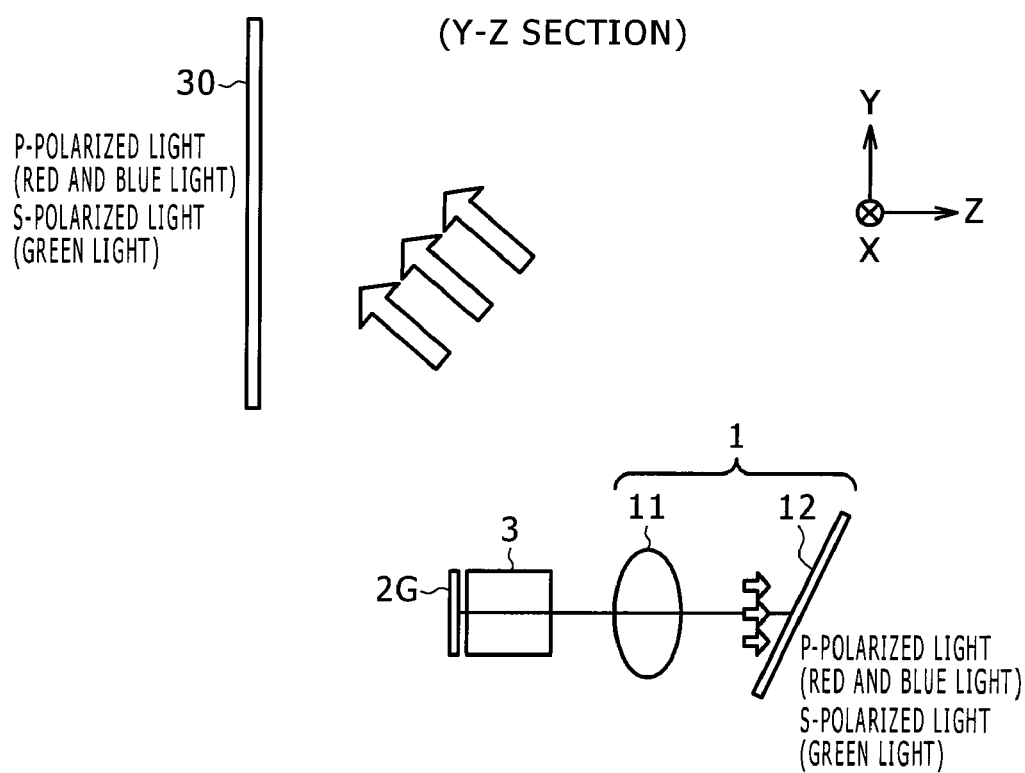
FIG. 2B is another sectional block diagram of the conventional projection optical system.

Next, with reference to FIGS. 2A and 2B, the relationship between a projection optical system using a free-form surface mirror as a projection mirror and the position of a crossed prism in the system will be described. FIG. 2A is a sectional (X-Z sectional) block diagram of a conventional projection optical system. FIG. 2B is another sectional (Y-Z sectional) block diagram of the conventional projection optical system. FIGS. 2A and 2B each include indications of X, Y, and Z directions.

Referring to FIGS. 2A and 2B, the red light outputted from an image display element 2R, the green light outputted from an image display element 2G, and the blue light outputted from an image display element 2B is color-synthesized by a crossed prism 3 in which dichroic film surfaces mutually cross forming a cross-like sectional view. The color-synthesized red, green, and blue light is projected on an image projection surface 30 after being refracted at a refractive lens 11 and reflected at a projection mirror 12 which is a free-form surface mirror.

A crossed prism 3 for synthesizing three colored light beams transmits one of the three colored light beams while reflecting the other two colored light beams. When the calculation result shown in FIG. 1 is considered in relation with the arrangement of the image display elements 2R, 2G, and 2B shown in FIG. 2A, it is known desirable to color-synthesize red light as S-polarized light, green light as P-polarized light, and blue light as S-polarized light.

In the crossed prism 3, the normal lines of the dichroic surfaces forming a cross-like section are in the X-Z plane, but the normal lines of the projection mirror 12 and the image projection surface 30 are in the Y-Z plane. As shown in FIG. 2B, therefore, the red light and blue light S-polarized at the crossed prism 3 is P-polarized at the projection mirror 12 and the image projection surface 30. Conversely, the green light P-polarized at the crossed prism 3 is S-polarized at the projection mirror 12 and the image projection surface 30.

Figure 3:
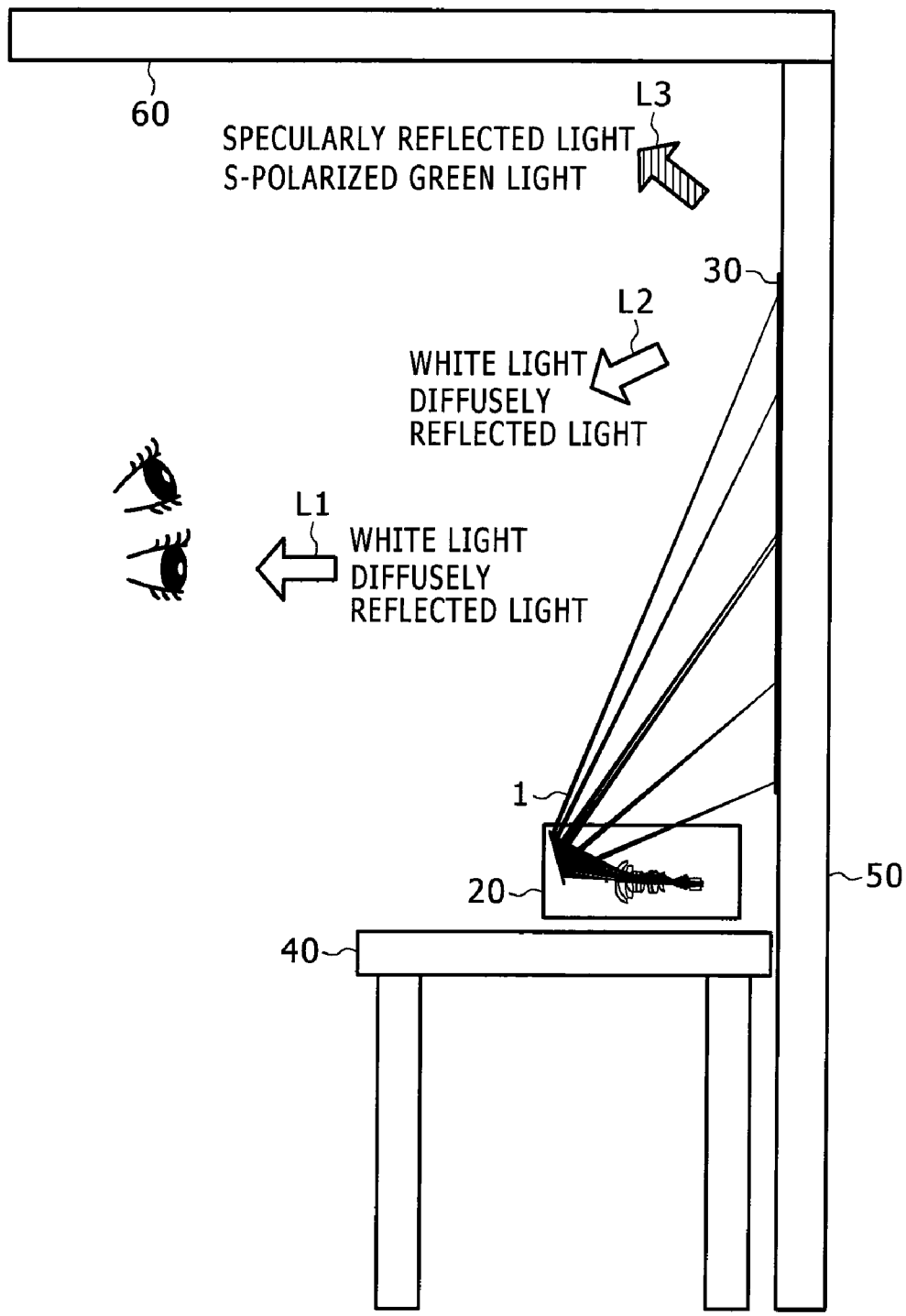
FIG. 3 is a schematic diagram illustrating color unevenness in an image displayed on a vertical surface.
Figure 4:
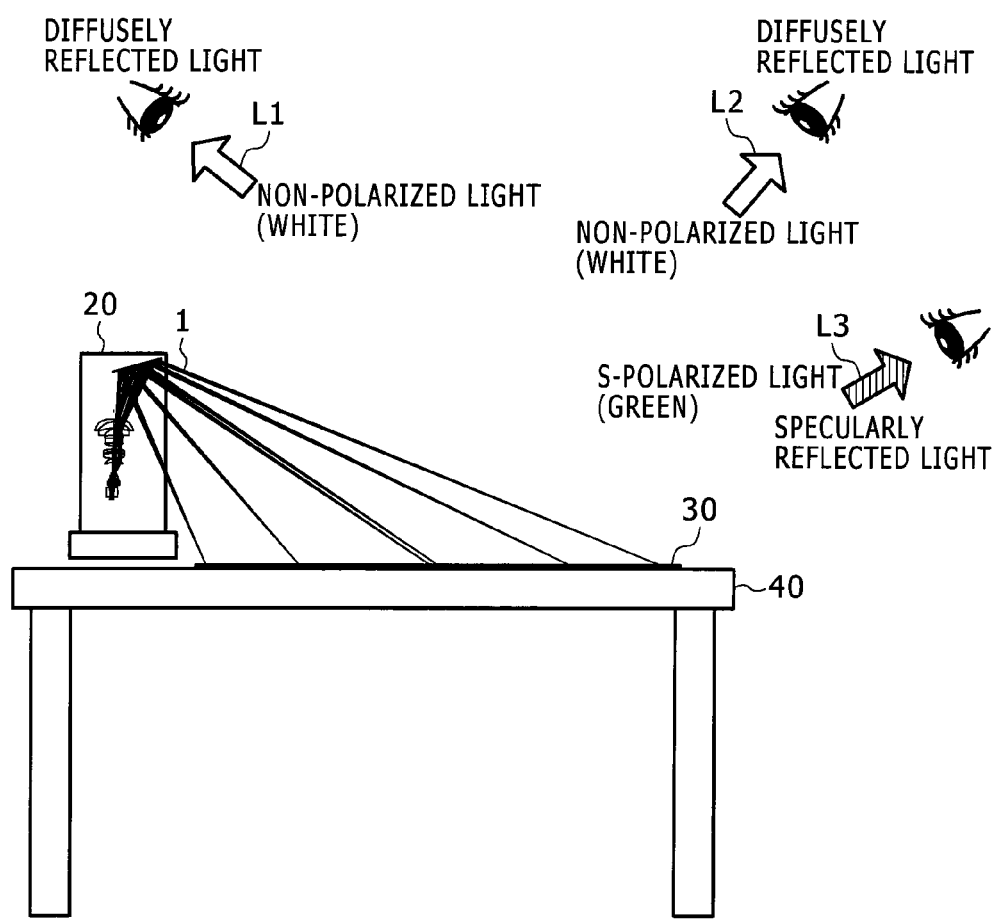
FIG. 4 is a schematic diagram illustrating color unevenness in an image displayed on a horizontal surface.

Next, with reference to FIGS. 3 and 4, the occurrence of color unevenness in an image reflected by the projection mirror 12 and projected on the image projection surface 30 will be explained. FIG. 3 is a schematic diagram illustrating color unevenness in an image displayed on a vertical surface. FIG. 4 is a schematic diagram illustrating color unevenness in an image displayed on a horizontal surface.

As shown in FIG. 3, when an image is projected on a vertical surface such as a wall surface 50 by a projection type image display device 20 horizontally placed on a table 40, the image light incident at a large angle to the wall surface 50 and reflected specularly from there travels toward a ceiling 60 (denoted by L3 in FIG. 3), so that the viewer does not see the reflected light. The viewer approximately squarely facing the image projection surface sees image light (denoted by L1 and L2 in FIG. 3) diffusely reflected from the wall surface 50. Namely, the viewer sees almost non-polarized red, green, and blue image light involving almost no reflectance difference between colors, so that color unevenness is not observed.

When, as shown in FIG. 4, an image is projected on the surface of a table 40 by the projection type image display device 20 vertically erected on the table 40, however, the image light incident at a large angle to the surface of the table 40 and reflected specularly from there (denoted by L3 in FIG. 4) can be seen by the viewer. As being explained later, in cases where the incident angle of light incident to the image projection surface 30 is large, for example, 70 degrees, the reflectance of S-polarized light becomes much larger than that of P-polarized light. Hence, the image projection surface 30 reflects the green light that is S-polarized with a large reflectance causing image light with color unevenness in green to be seen by the viewer.

In the following, an embodiment of the present invention will be described in detail.

In the reflection optical system of the embodiment, a flat mirror is used, instead of a free-form surface mirror generally used in conventional reflection optical systems, as a projection mirror so as to make projection mirror design and manufacture easier and to eventually facilitate cost reduction. There are problems, as described above, to be addressed in realizing the present embodiment in which a flat mirror is used. Firstly, it is difficult to design an optical system in which no part of the reflected light returns to the projector body. Secondly, when light hits a projection mirror at a large incident angle, color unevenness attributable to differences in reflectance between P-polarized light and S-polarized light increases.

Figure 5:
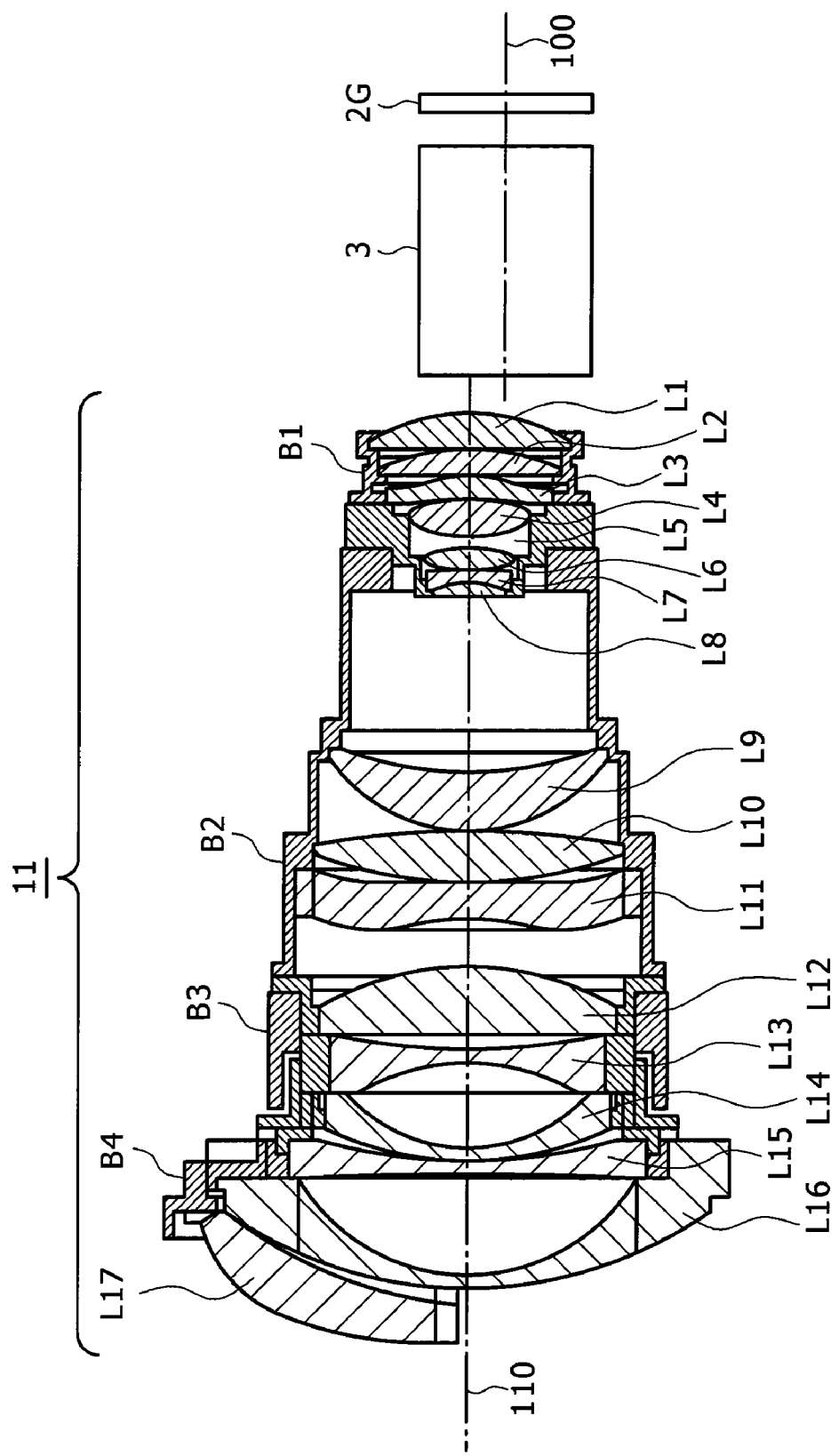
FIG. 5 is a sectional view of a projection lens system included in a diagonal projection optical system according to an embodiment of the present invention.
Figure 6:
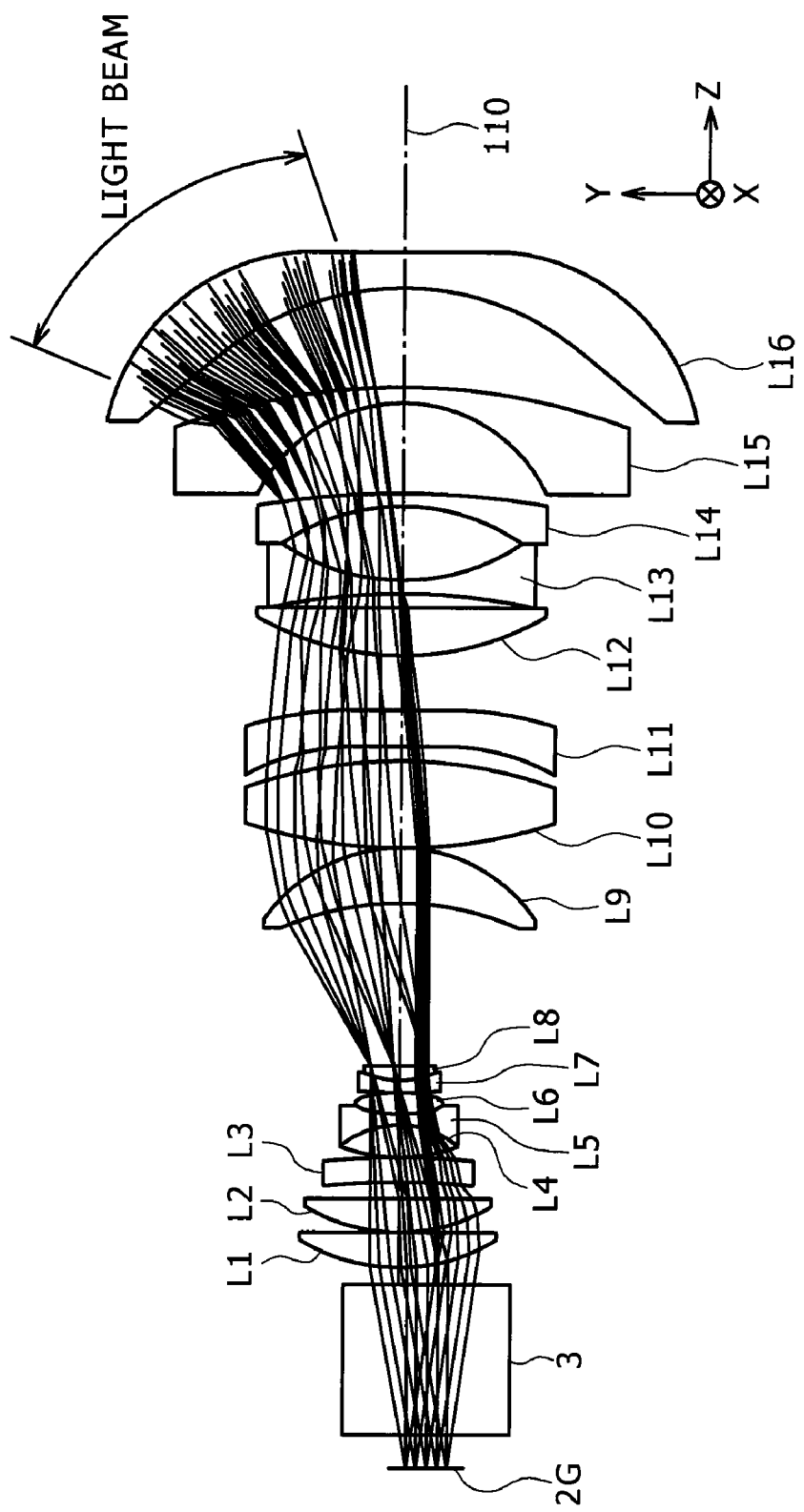
FIG. 6 is a sectional view of the lens system configuration of a diagonal projection optical system according to an embodiment of the present invention and ray traces plotted for the lens system.

In the present embodiment, a diagonal projection type optical system, being described below, is applied to the refractive lens 11. To realize an optical system in which no part of the reflected light returns to the projector body, the color-synthesized red, green, and blue light is diagonally projected on a projection mirror. This will be explained with reference to FIGS. 5 and 6. FIG. 5 is a sectional view of a projection lens system included in the diagonal projection optical system of the present embodiment. FIG. 6 shows a sectional view, like FIG. 2B, in a Y-Z plane of the lens system configuration of the diagonal projection optical system of the present embodiment and ray traces plotted for the lens system.

In FIG. 5, for the sake of convenience in describing the projection optical system, the image display element 2G and the crossed prism 3 are shown on the right side with a projection surface assumed to be on the left side.

An optical axis 110 shared by plural lenses (e.g. L1 to L16) is shifted, in the Y direction, from an optical axis 100 of the image display element 2G and the crossed prism 3, so that much of the light incident from the crossed prism 3 to the lens L1 hits a lower half part of the lens L1.

The lens L17 disposed closest to the projection surface is, for example, an aspheric plastic lens. The effective area, through which image light passes, of the lens 17 is disposed off the optical axis 110 shared by the plural lenses. The beam of light forming an image in a peripheral part of a display screen can, therefore, be controlled by adjusting only the shape of the lens L17. As a result, it is made possible to correct the trapezoidal distortion caused by diagonal projection and the aberration (particularly, high-order coma aberration and astigmatism) caused by super wide angle lenses. The lens L17 has a rectangular shape whose aspect ratio is approximately the same as that of the effective area of the image display surface or a trapezoidal shape corresponding to an area through which the image light passes. Such a shape of the lens L17 is also effective in blocking unwanted light detrimental to the imaging performance of the lens system. Furthermore, since the lens L17 having a non-circular external shape which is asymmetric about the optical axis 110 can be made small, it is possible, even when the diagonal projection optical system of the present embodiment is housed in the enclosure of the projection type image display device, to keep the external shape of the lens L17 within a maximum width, in the vertical direction of the projection surface, of the enclosure surface facing the projection surface. At the same time, with the contour center of the lens L17 positioned above the center line of the enclosure surface facing the projection mirror, the projection optical system appears well balanced, greatly improving overall designability.

Namely, the projection optical system used in the present embodiment makes up a diagonal projection optical system including plural lenses and, in the diagonal projection optical system, the effective area, along the vertical direction of an image, through which a light beam passes of at least the lens L17 disposed closest to the projection surface is off an optical axis of the other plurality of lenses, shared by the most lenses (e.g. shared by lenses L1 to L16).

With reference to FIG. 5, only the lens L17 has been described as having a rectangular shape whose aspect ratio is approximately the same as that of the effective area of the image display surface or a trapezoidal shape corresponding to an area through which the image light passes (in FIG. 5, the lens L17 is shown in a sectional view). The lens system configuration used to realize the diagonal projection optical system of the present embodiment, however, includes, as shown in FIG. 6, more lenses such as L14 and L15 having an area which no image light passes. Determining the external shapes of such lenses by removing the areas that no image light passes can make such lenses smaller than conventional equivalent lenses shaped symmetrically about their optical axis. Making such lenses smaller is effective in making the projection type image display device including the optical system smaller and lighter.

The lenses L3 and L11 are also aspheric plastic lenses. Their effective areas which the image light passes are positioned to include the optical axis 110 shared by plural lenses included in the diagonal projection optical system, so that they are aspherically shaped to be symmetrical about the optical axis 110. The projection lens system used in the diagonal projection optical system of the present embodiment includes 14 glass lenses and 3 plastic lenses totaling 17 lenses which are fixedly retained in a lens barrel having four parts (B1, B2, B3, and B4). When the projection distance is changed causing a change in magnification factor, the projection lens focus can be adjusted by changing the position of the lens barrel part B4 relative to the lens barrel part B3.

FIG. 6 shows ray traces plotted for a diagonal projection lens system, including lenses L1 to L16, which operates similarly to the lens system shown in FIG. 5 for the present embodiment. Most of the light outputted from the image display element 2G is incident, via the crossed prism 3, to a lower half part of the lens L1 included in the diagonal projection lens system. The incident light then travels gradually upwardly relative to the optical axis 110. Take the lenses L14, L15, and L16, for example. The incident light passes only upper half parts of the respective lenses. Thus, as mentioned above, the lenses L14, L15, and L16 require their parts above the optical axis 110 only.

As shown in FIG. 6, the light beam outputted from the lens L16 is largely inclined upward, so that the problem in which part of the light reflected from the projection mirror returns to the projector body does not occur.

As well known, in a conventional projection optical system, a projection light beam is outputted straightforward along an optical axis shared by plural lenses. It has therefore been possible, in cases where a flat mirror is used as a projection mirror, that part of the projection light beam reflected by the flat projection mirror returns to the projector body. In the present embodiment, the diagonal projection optical system is used making it possible to use a flat mirror as a projection mirror without causing the above problem. The present embodiment also has effects to make the device smaller and lighter.

Next, how the problem that a large incident angle of the light incident to the projection mirror increases differences in reflectance between P-polarized light and S-polarized light to eventually increase color unevenness is solved in the present embodiment will be explained with reference to FIGS. 7A, 7B, and 8 to 11.

Figure 7A:
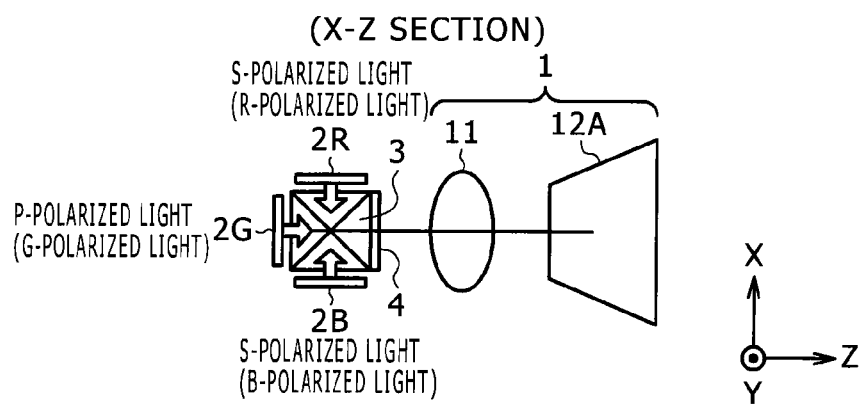
FIG. 7A is a sectional block diagram of a projection optical system according to an embodiment of the present invention.
Figure 7B:
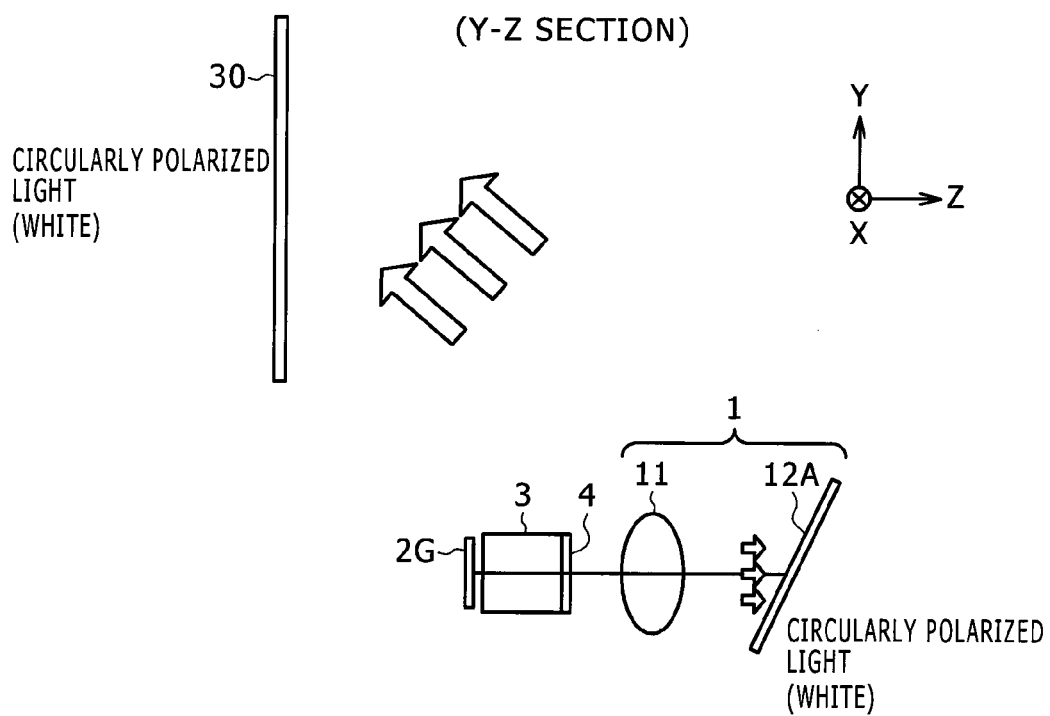
FIG. 7B is another sectional block diagram of a projection optical system according to an embodiment of the present invention.

FIG. 7A is a sectional (X-Z sectional) block diagram of a projection optical system according to an embodiment of the present invention. FIG. 7B is another sectional (Y-Z sectional) block diagram of the projection optical system according to the embodiment. FIGS. 7A and 7B each include indications of X, Y, and Z directions.

FIGS. 7A and 7B are basic configuration diagrams for explaining the state of optical polarization between the image display elements 2 and the image projection surface 30. The illumination optical system being described later is omitted in FIGS. 7A and 7B. The image light having passed the image display elements 2R, 2G, and 2B for red, green, and blue, respectively, is, after being color-synthesized by the crossed prism 3, enlargedly projected on the image projection surface 30 by the projection optical system 1 including the refractive lens 11 and the projection mirror 12A. Note that, in the present embodiment, the projection mirror 12A is a flat mirror as mentioned above.

As stated above, the green light transmitted through the image display element 2G for green light is transmitted through the crossed prism 3 for color synthesis, so that the green light is preferably P-polarized relative to the crossed prism 3. The red light transmitted through the image display element 2R for red light and the blue light transmitted through the image display element 2B for blue light is reflected by the crossed prism 3, so that the red light and the blue light is preferably S-polarized relative to the crossed prism 3. Note that light P-polarized relative to the crossed prism 3 is S-polarized relative to the projection mirror 12 and the image projection surface 30 and that light S-polarized relative to the crossed prism 3 is P-polarized relative to the projection mirror 12 and the image projection surface 30.

In the configuration, a quarter wavelength plate is disposed as a polarization converter 4 at an output surface of the crossed prism 3, so that the P-polarized green light and the S-polarized red light and blue light can be projected on the image projection surface 30 as circularly polarized light.

Figure 8:
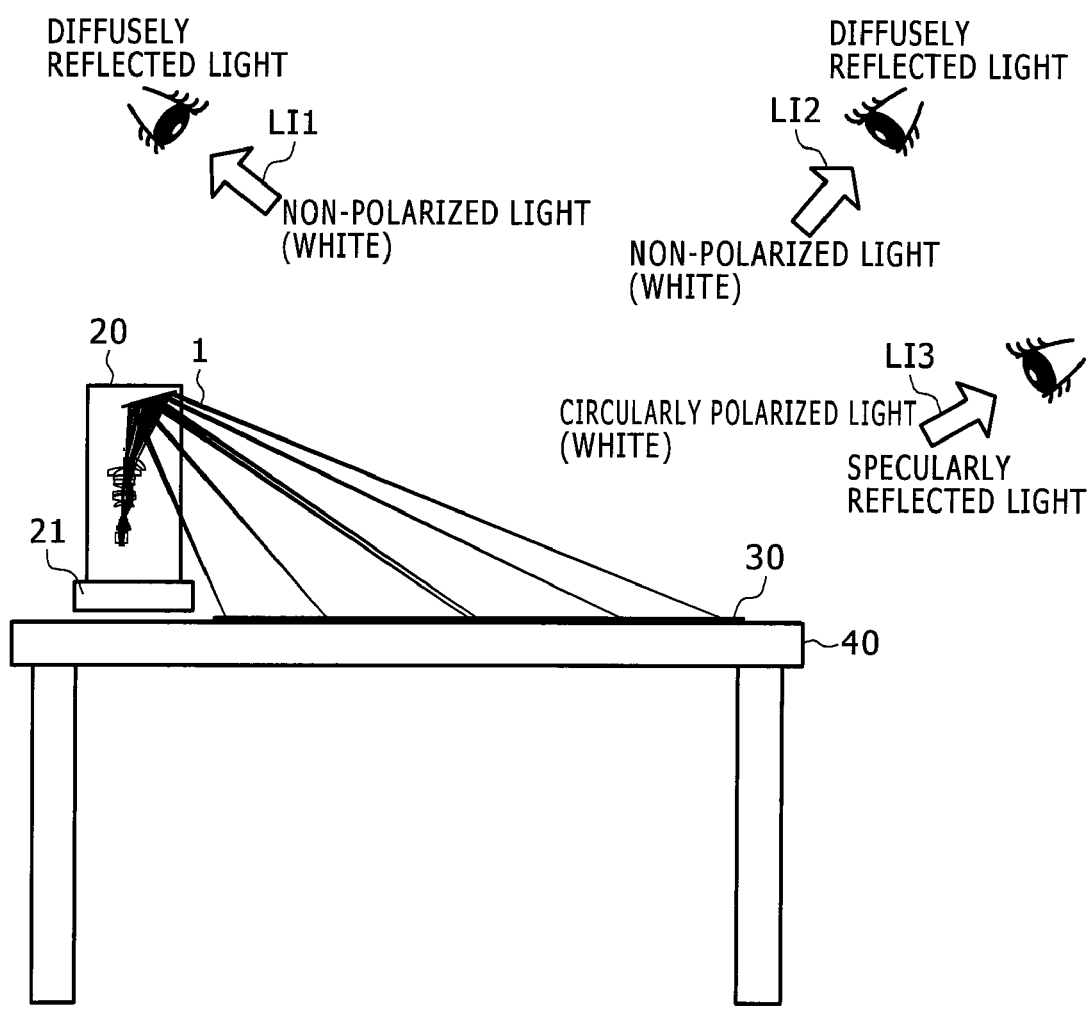
FIG. 8 shows a polarization state in an image displayed on a horizontal surface according to an embodiment of the present invention.

FIG. 8 shows a polarization state in an image displayed on a horizontal surface according to an embodiment of the present invention. In the arrangement shown in FIG. 8, the projection type image display device 20 is vertically erected, via a structure 21, on a horizontal surface of a table 40 and an image is projected on the horizontal surface used as the image projection surface 30. The structure 21 may be either integral with or discrete from the projection type display device 20.

Of the reflected light, L11 is diffusely reflected light, so that it is free of color unevenness attributable to the states of polarization of differently colored light. L12 is diffusely reflected light with a specularly reflected light component. Because L12 is a reflection of light with a small incident angle, even if it contains differently polarized, differently colored light, the resultant color unevenness is of an ignorable degree. L13 contains large specularly reflected light components, so that, if L13 contains differently polarized, differently colored light, color unevenness is caused by differences in reflectance at the image projection surface 30 between differently colored light. In the present embodiment, however, the polarization converter 4, i.e. a quarter wavelength plate, is disposed at the output surface of the crossed prism 3 as described above to circularly polarize the differently colored light, so that there is almost no difference in reflectance attributable to differences in incident angle between the red, green, and blue light. Hence L13 does not show color unevenness.

Figure 9A:
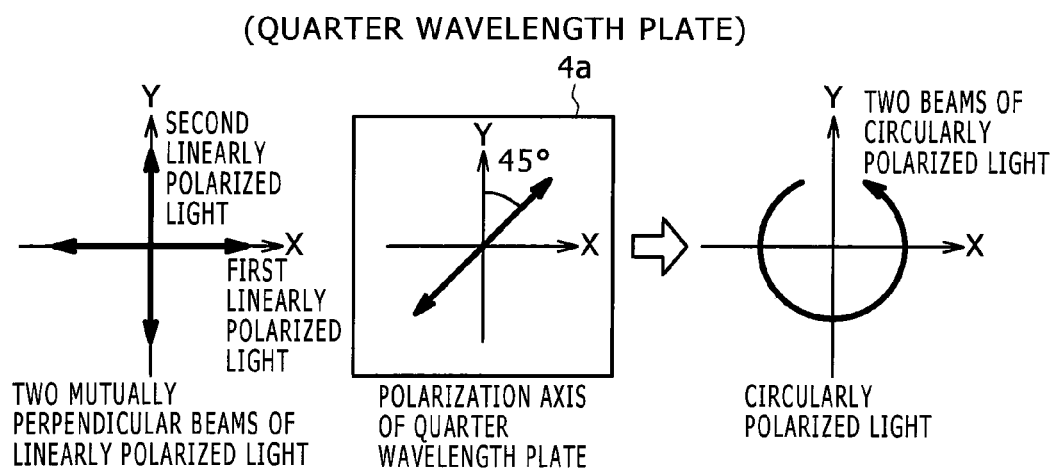
FIG. 9A illustrates a polarization conversion operation performed using a quarter wavelength plate.

The polarization conversion operation applied to differently colored light of the quarter wavelength plate will be described in detail with reference to FIG. 9A. FIG. 9A illustrates that each of mutually perpendicular first linearly polarized light and second linearly polarized light (P-polarized light and S-polarized light) outputted from the crossed prism 3 is converted into circularly polarized light by a quarter wavelength plate 4a with a polarization axis extending at 45 degrees relative to the polarization axis of each of the first linearly polarized light and the second linearly polarized light. To be exact, the circularly polarized light out of the first linearly polarized light and the circularly polarized light out of the second linearly polarized light differs from each other in rotational direction. The difference, however, is not detected as color unevenness, since the differently colored light is reflected with a same reflectance at the image projection surface 30.

Next, The polarization conversion operation applied to differently colored light of a half wavelength plate, used instead of the quarter wavelength plate, will be described in detail with reference to FIG. 9B. In FIG. 9A, the differently colored light transmitted through the polarization converter 4 using a quarter wavelength plate is shown circularly polarized. When the quarter wavelength plate is replaced by a half wavelength plate, the differently colored light is converted into two kinds of linearly polarized light oscillating in 45 degree and −45 degree directions, respectively. Namely, the linearly polarized light oscillating in a 45-degree diagonal direction is divided into two vector components, i.e. a P-polarized light vector component and an S-polarized light vector component relative to the incidence plane defined by a normal to the image projection surface 30 and a plane including the incident light. Similarly, the linearly polarized light oscillating in a −45 degree diagonal direction is divided into two vector components, i.e. an S-polarized light vector component and a P-polarized light vector component. Thus, the polarization states of differently colored light become identical.

Figure 9B:
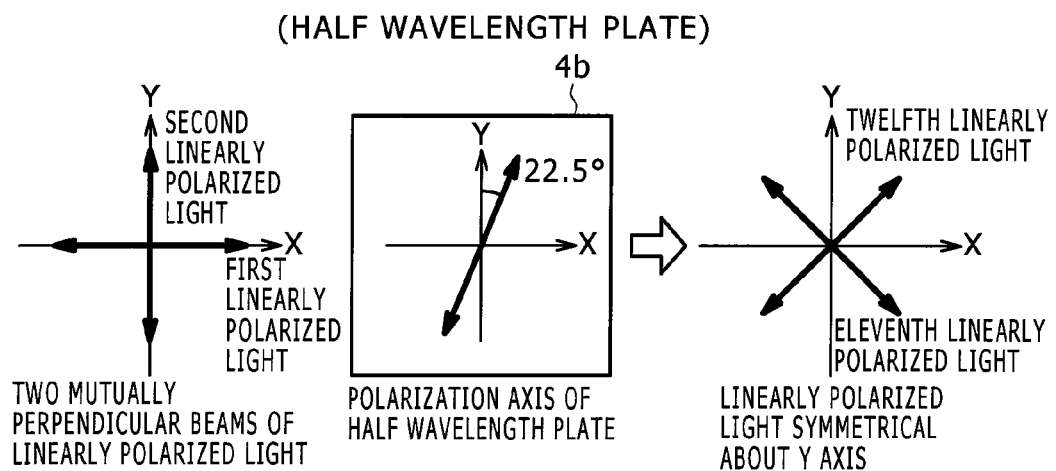
FIG. 9B illustrates a polarization conversion operation performed using a half wavelength plate.

Referring to FIG. 9B, a half wavelength plate 4b having a polarization axis inclined 67.5 degrees relative to the first linearly polarized light is disposed for the second linearly polarized light (P-polarized light and S-polarized light) perpendicularly crossing the first linearly polarized light outputted from the crossed prism 3, causing the first linearly polarized light to be converted into eleventh linearly polarized light with an oscillation axis rotated by 135 degrees. In this arrangement, the polarization axis of the half wavelength plate 4b is inclined 22.5 degrees relative to the second linearly polarized light, so that the second linearly polarized light is converted into 12th linearly polarized light with an oscillation axis rotated by 45 degrees. Hence, the differently colored light is reflected at the image projection surface 30 at a same reflectance, so that color unevenness is not detected.

Next, the polarization conversion performed for differently colored light when a color-selective polarization rotator is used as the polarization converter 4 will be described in detail with reference to FIG. 9C. The color-selective polarization rotator 4 is for selectively rotating the polarization direction of visible light of a specific color (of a specific wavelength band) by 90 degrees. Namely, the color-selective polarization rotator 4 functions as a λ/2 plate selectively for visible light of a specific wavelength band. In the case shown in FIG. 9C, blue light of a wavelength band of about 400 to 500 nm, and red light of a wavelength band of about 600 to 700 nm selectively undergo polarization rotation, whereas green light of other wavelength band does not undergo such polarization rotation. As shown in FIG. 9C, the s-polarized blue light and red light enter the color-selective polarization rotator to be converted into p-polarized light, whereas the P-polarized green light enters the color-selective polarization rotator to be outputted unchanged. After passing the color-selective polarization rotator 4c, therefore, the red light, the green light, and the blue light is P-polarized. Hence, the red, green, and blue light is reflected at the image projection surface 30 at a same reflectance, so that color unevenness is not detected.

Figure 10:
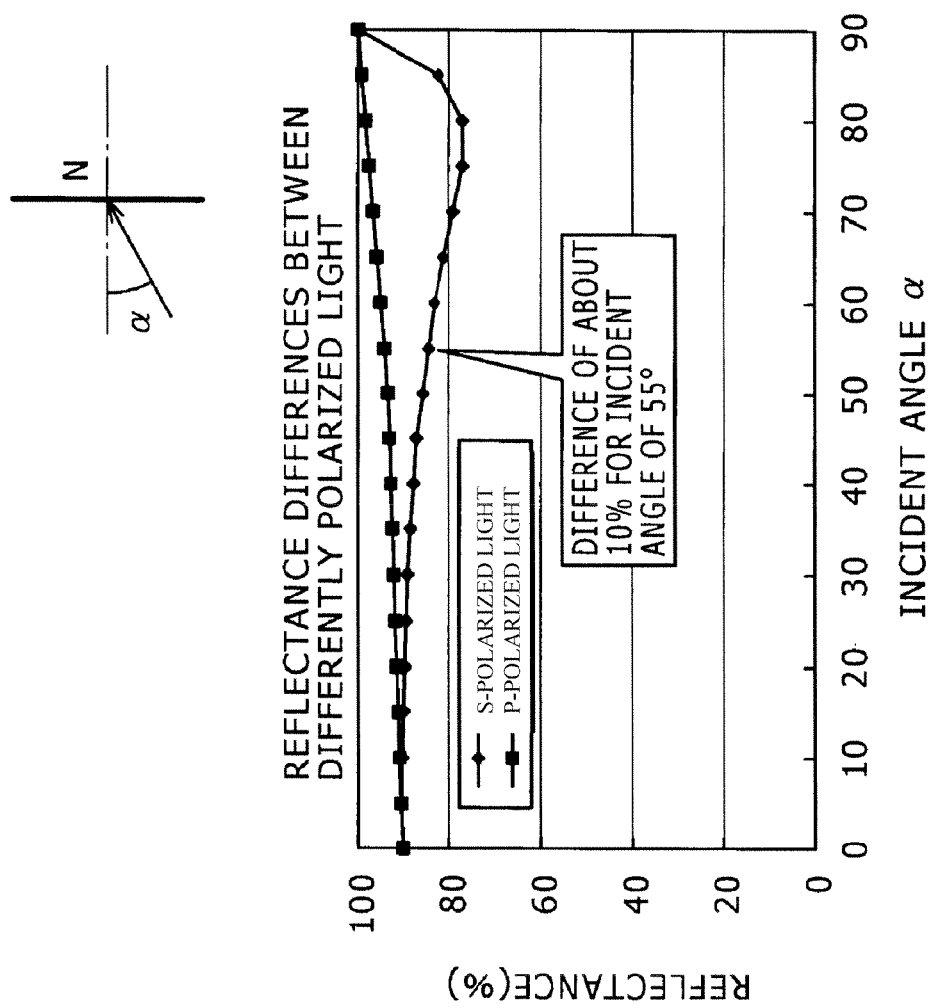
FIG. 10 shows the relationship between the incident angle and reflectance observed using an aluminum projection mirror.

FIG. 10 shows the relationship between the incident angle (horizontal axis) and reflectance (vertical axis) for P-polarized light and S-polarized light observed using an aluminum projection mirror.

When the incident angle is 45 degrees, the difference in reflectance between S-polarized light and P-polarized light is only 6%. The difference increases to 10% when the incident angle increases to 55 degrees and to 18% when the incident angle increases to 70 degrees. Thus, it can be assumed that, in cases where no polarization converter like the polarization converter 4 of the present embodiment is used, color unevenness can be caused even by a difference in reflectance between P-polarized light and S-polarized light alone.

When a conventional free-form surface mirror is used as a projection mirror, the incident angle of a maximum incident angle portion of the mirror can be made, for example, about 46 degrees. When a flat mirror is used under the same conditions for projection as for the free-form surface mirror, the maximum incident angle can be made about 66 degrees. It is, therefore, known that the polarization converter 4 of the present embodiment is an important system component in using a flat mirror for projection.

FIGS. 11A, 11B, and 11C show data measured with incident angles of 60 degrees, 45 degrees, and 30 degrees, respectively, to compare the reflectance between when a quarter wavelength plate is used and when not used. In each of the graphs shown in FIGS. 11A to 11C, the vertical axis represents reflectance and the horizontal axis represents the wavelength of incident light. The wavelengths of S-polarized blue light, P-polarized green light, and S-polarized red light are on the orders of 400 nm, 500 nm, and 600 nm, respectively.

When no quarter wavelength plate is used, a larger incident angle results in larger reflectance differences between the green light and the light of the other two colors, causing color unevenness with an inclination toward greenishness. FIGS. 11A, 11B, and 11C indicate that such a problem does not occur when a quarter wavelength plate is used.

As stated in the foregoing, a similar advantageous effects can be obtained by using a half wavelength plate or a color-selective polarization rotator.

Figure 12:
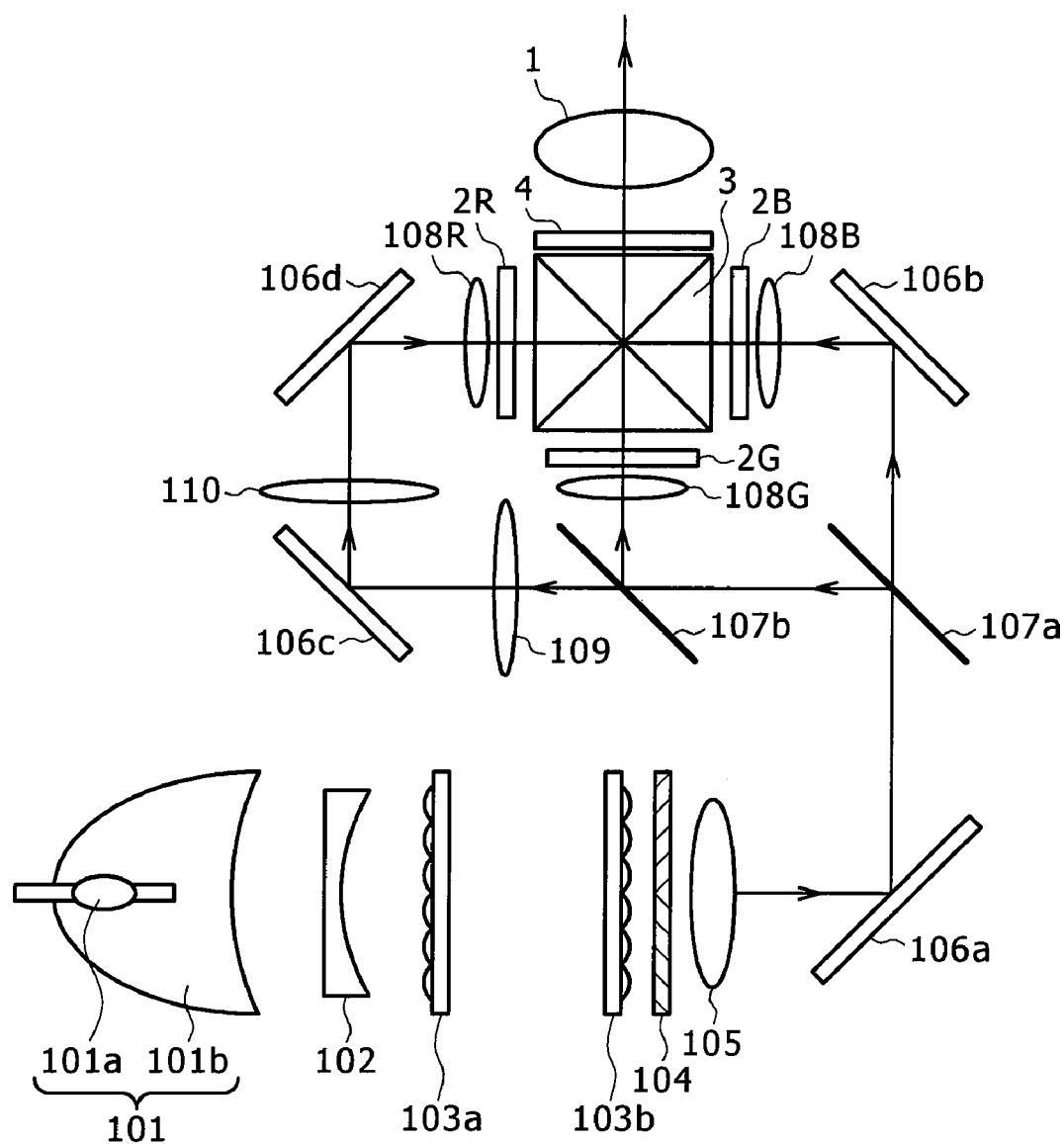
FIG. 12 is a block diagram of an illumination optical system according to an embodiment of the present invention.

With reference to FIG. 12, an illumination optical system for illuminating the image display elements 2R, 2G, and 2B of an embodiment of the present invention will be described below. Referring to FIG. 12, a light source unit 101 includes a bulb 101a used as a light emitter and a reflector 101b serving as a reflection surface. A light beam emitted from the bulb 101a disposed at a first focal position of the elliptical reflector 101B is reflected to be converged to a second focal position of the reflector 101b. The converged light beam whose beam size has been reduced is converted into a parallel light beam by a concave lens 102 capable of parallelizing a light beam. When the reflector 101b has a parabolic surface, the concave lens 102 for beam parallelization is not required.

The parallel light beam outputted from the concave lens 102 is divided, by a first multi-lens array 103a, into split light beams corresponding to the lens cells of the first multi-lens array 103a. The split light beams are then collected on to the lens cells, corresponding to the lens cells of the first multi-lens array 103a, of a second multi-lens array 103b. Each of the split light beams thus collected is once divided, by a linear polarization unit 104, into two linearly polarized light beams whose oscillation directions cross each other. The two linearly polarized light beams are then converted into a linearly polarized light beam by aligning the oscillation direction of one of the two linearly polarized light beams with the oscillation direction of the other linearly polarized light beam. The split light beams outputted from the linear polarization unit 104 are then superimposedly outputted from a superimposing lens 105 to the image display elements 2R, 2G, and 2B for red, green, and blue. The optical paths between the superimposing lens 105 and the image display elements 2R, 2G, and 2B are provided with such components as reflection mirrors 106a, 106b, 106c, and 106d each used to bend an optical path, dichroic mirrors 107a and 107b used as optical units for color separation, and collimator lenses 108R, 108G, and 108B disposed in front of the image display elements 2R, 2G, and 2B, respectively, to collimate the principal rays of the projection light beam. The optical path for red light that differs in length from the optical paths for blue and green light is provided with relay lenses 109 and 110 for mapping the superimposed light beam at where the image display element 2R for red light is disposed.

The light beam emitted from the bulb 101a is inputted to the image display elements 2R, 2G, and 2G as described above.

The above embodiment is only an example embodiment of the present invention, and the invention is not limited to the above embodiment. The projection lens of the diagonal projection optical system and the illumination optical system described above, for example, may have different configurations than described above. Also, the polarization converter to be used need not necessarily be a quarter or half wavelength plate or a color-selective polarization rotator. The above embodiment can be modified in many different ways without departing from the scope and spirit of the present invention.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A projection type image display device for displaying an image by projecting the image on an imaging surface, comprising:
   three image display elements for displaying red light, green light and blue light;
   an illumination optical system for illuminating the three image display elements;
   a color synthesis unit for color-synthesizing the red, green and blue light received from the three image display elements;
   a polarization converter which is a color-selective polarization rotator and adjusts light received from the color synthesis unit to p-polarized light;
   a projection optical system which outputs light supplied from the polarization converter in a direction inclined by a predetermined inclination angle; and
   a flat mirror which reflects light received from the projection optical system in a direction for protection,
   wherein the projection optical system includes a plurality of lenses including one lens disposed closest to the flat mirror, the one lens having an effective area, along a vertical direction of the image, through which a light beam passes and which is off an optical axis of the other lenses.

2. The projection type image display device according to claim 1, wherein:
   the optical axis of the other lenses is off a central axis of the color synthesis unit.

3. The projection type image display device according to claim 1, wherein the color synthesis unit is a crossed prism.

* * * * *